Jan. 27, 1959 W. W. PHARIS 2,871,296

REVERTING CALL CIRCUIT

Filed July 30, 1956 5 Sheets-Sheet 1

INVENTOR.
WILLIAM W. PHARIS
BY J. Warren Whitesel
ATTORNEY

FIG. 2 REVERTING CALL CIRCUIT 108

REVERTING CALL CIRCUIT 108

REVERTING CALL CIRCUIT 108

FIG. 5 REVERTING CALL CIRCUIT 108

United States Patent Office
2,871,296
Patented Jan. 27, 1959

2,871,296

REVERTING CALL CIRCUIT

William W. Pharis, Rochester, N. Y., assignor to General Dynamics Corporation, Rochester, N. Y., a corporation of Delaware Application July 30, 1956, Serial No. 600,869

6 Claims. (Cl. 179—17)

This invention relates to automatic telephone systems and more particularly to reverting call circuits for use in automatic telephone systems.

In general, telephone systems may provide means for extending calls between subscriber stations. While some types of calls may be completed in a simple and uncomplicated manner, other calls, such as reverting calls, for example, may require additional circuits, equipment, operations, and the like. The term "reverting call" means one which may be extended between subscribers who share a party line. A particular problem which relates to reverting calls results from the fact that calling subscribers mark the called lines (their own) as busy, thus preventing calls from being extended thereto. Therefore, it may be desirable to provide means for holding circuits and equipment extending reverting calls throughout periods during which called lines have their busy markings removed. Another type of call which may require special circuits, equipment, operations, and the like, may involve switching means wherein less than a full complement of digit pulses may be necessary. For example, certain calls may involve fewer switching stages and therefore fewer digits while other calls may require more switching stages and therefore more digits. Modern telephone techniques usually require universal numbering wherein all directory numbers include a similar number of digits; therefore, on some calls, it may be desirable to absorb or otherwise eliminate unnecessary digits. Still more complicated techniques may combine problems of reverting calls with problems of universal numbering schemes so that it may be desirable during reverting calls, first, to recognize such reverting calls, and, second, to discard any unnecessary digits that may be included in directory numbers.

An object of this invention is to provide new and improved reverting call means.

Another object of this invention is to provide means in reverting call circuits for absorbing digit indications.

The subject invention accomplishes the above-cited and other objects by providing means for establishing reverting calls which includes means for counting digit indications that may be received during a given call, for absorbing any unnecessary digits, for withholding at least one digit indication that may be necessary to complete a busy test, and for transmitting the withheld digit or digits to control the application of a busy test.

According to my invention, switching means may be directed by a prefix number (two digits, for example) to seize suitable means for establishing reverting calls; then, a full directory number, such as seven digits, for example, may be dialed, thereby making a total of nine digits that are used to establish reverting calls. If it is assumed that only six digits are necessary to establish reverting calls, three digits must be absorbed; therefore, means may be provided for counting a predetermined number of digit pulse trains (three in the example cited), while holding repeating means inoperative, after which repeating means may be utilized for the transmission of digit pulse trains to succeeding equipment. The means for counting digit pulse trains continues to operate and after an additional number of digit pulse trains are sent the repeating means is again rendered inoperative. Thereafter, final digit indications may be withheld or stored by the reverting call means, the switching means being adapted to postpone its busy test at this time. The reverting call means returns a special busy signal thereby indicating that the calling subscriber must hang-up. When the calling subscriber hangs up in response to such signal, the final digit indications that were withheld or stored by the reverting call means may be repeated to succeeding switching means which may be adapted to complete a busy test. Upon finding an idle called line (the calling subscriber having then hung-up), the call being described may be extended to the called station. When the called party answers, the reverting call means may be released, there being no need for holding it throughout the call.

Further objects and advantages of my invention will become apparent as the following description proceeds, and the features of novelty which characterize my invention will be pointed out with particularity in the claims annexed to and forming part of this specification.

Next, reference is made to the attached drawings, in which.

I have tried to use simple and specific terms where possible to facilitate an understanding of the invention; however, I want it understood that the use of these simple and specific terms is not to act in any manner as a disclaimer of the full range of equivalents which is normally given under established rules of patent law. To illustrate, the attached drawings show the source of office potential by means of plus (+) and minus (—) signs. As in most telephone systems, the plus terminal is described as being at ground potential; however, it should be understood that either this or any other suitable power supply may be used. Still further, the heavily inked block 108 indicates that portion of the system which is shown in detail by means of Figs. 2–5. The remaining blocks of Fig. 1, that are shown by lightly inked rectangles, are items which are well known to those skilled in the art. Any suitable equipment may be used to provide the functions represented by these blocks. Further, I have described my invention as utilizing a minor switch which is a device wherein a stepping magnet drives a set of shorting brushes over a bank of contacts which includes individual contacts and a shorting bar, the brush making connection between an individual contact and the shorting bar depending upon the step to which the switch is driven. The minor switch is also provided with off-normal contacts which are adapted to operate when the minor switch takes its first step off-normal. Means other than a minor switch could be used to provide these functions, such as a chain of counting relays, for example. Quite obviously, other examples could be selected to illustrate the manner in which the specific terms that I have used are entitled to a wider range of equivalents.

*Brief description*

Figure 1:
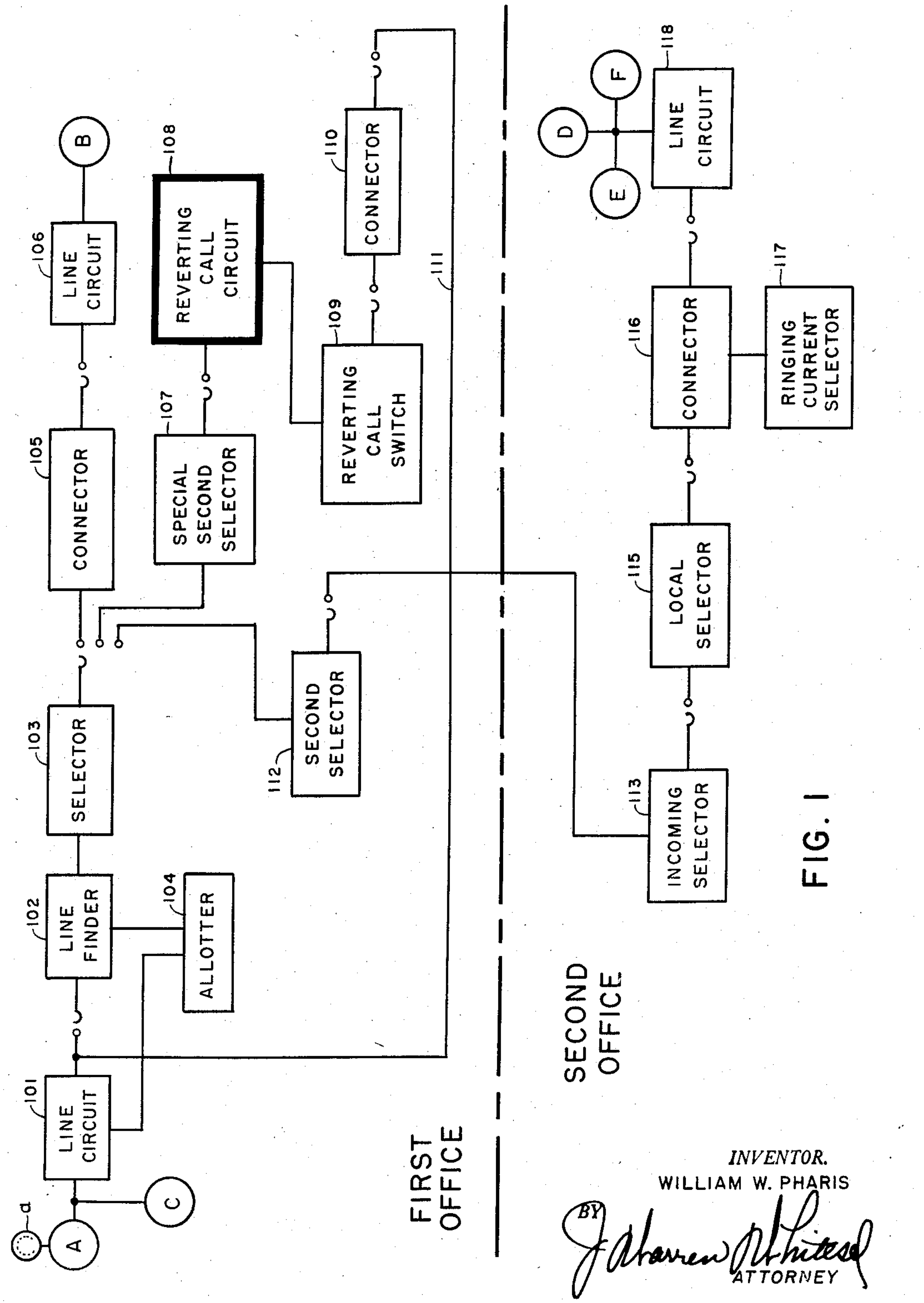
Fig. 1 shows by block diagram a telephone system which may utilize the subject invention.

Fig. 1 shows, by block diagram, one example of a telephone system which is useful for explaining the manner in which the invention operates. In the system represented in this figure, calling subscriber A may make three different types of calls through conventional switching means such as items numbered 105, 110 or 116. Line circuit 101 responds to the completion of a loop when subscriber A removes his receiver or handset. Thereafter, line circuit 101, line finder 102, and allotter 104 cooperate to find the calling line and to return dial tone to subscriber A who may then operate any suitable means for transmitting digit pulses, such as dial "*a*," for example, to transmit suitable digit indications representing a directory number which designates the line leading to subscriber B. One digit may cause selector 103 to operate while second and third digits may cause connector 105 to operate, thereby seizing and signaling subscriber B by way of line circuit 106. If subscriber B is served by a party line, a fourth digit may be necessary to select a particular mode of ringing.

On the other hand, if subscriber A operates dial "*a*" to transmit the directory number of subscriber D, one digit may operate selector 103, a second digit may direct selector 112, a third digit may control incoming selector 113, a fourth digit may cause local selector 115 to operate, while fifth and sixth digits may operate connector 116, and a seventh digit may drive ringing selector 117. A circuit may then be completed for signaling subscriber D via line circuit 118.

Still another call that subscriber A might make is a reverting call which means that subscriber A may seize his own line and ring-back over it to signal another party on his line. To make this call, subscriber A may operate dial "*a*" to transmit a directory number which identifies subscriber C and perhaps a suitable prefix number which identifies reverting calls. To illustrate, a first prefix digit may operate selector 103, a second prefix digit may drive special second selector 107, a third digit may control reverting call switch 109, and fourth, fifth and sixth digits may operate connector 110 and select a particular ringing mode, as required. A circuit is now completed for signaling subscriber C by way of line 111 and line circuit 101.

Each of the three calls, outlined above, requires a different number of digits; i. e., calls to subscriber B require three or four digits; calls to subscriber C require six digits, two of which may be prefix number digits that identify reverting calls; and calls to subscriber D require seven digits. Since seven is the maximum number of digits that are required in the system shown in Fig. 1, to provide universal numbering, all subscribers should have seven digit directory numbers. Therefore, a problem is presented in that a number of digit pulse trains must be canceled, absorbed or discarded during calls to subscribers B and C. Since only three or four digits are required to seize and signal subscriber station B, it is necessary to absorb three or four digits. Since only six digits are necessary to complete a reverting call from station A to station C—two of which may be reverting call identification prefix number digits—it is necessary to absorb three digits. On the other hand, it is not necessary to absorb any digits on calls to subscriber D. My invention provides means for absorbing a number of digits in reverting call circuit 108 depending upon the nature of the calls.

The foregoing description of calls requiring three, four, six or seven digits was cited by way of example only. Any number of digit indications may be required depending upon the nature of certain switching equipment which is not material to this invention.

*Detailed description*

It is thought that a more complete understanding of this invention may be had by making reference to a detailed description of the circuits shown in Figs. 2–5, which go to form means for establishing reverting calls and which fit into the system of Fig. 1, at the point indicated by box 108.

Figure 2:
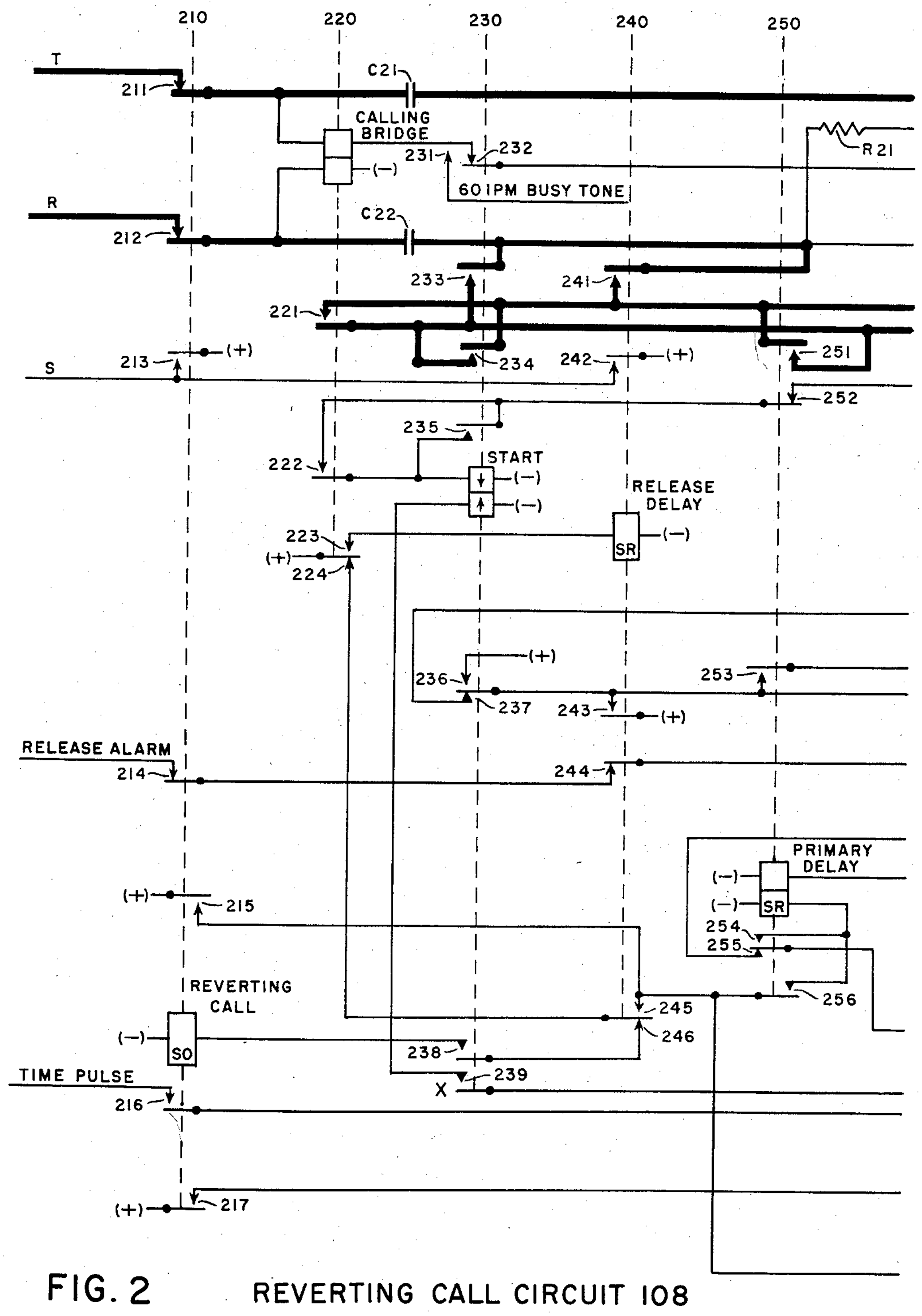
Figs. 2–5 show a reverting call circuit which is also shown in Fig. 1 by means of hollow rectangle 108; and, Fig. 6 shows the manner in which Figs. 2–5 should be joined to provide a complete and understandable circuit.
Figure 3:
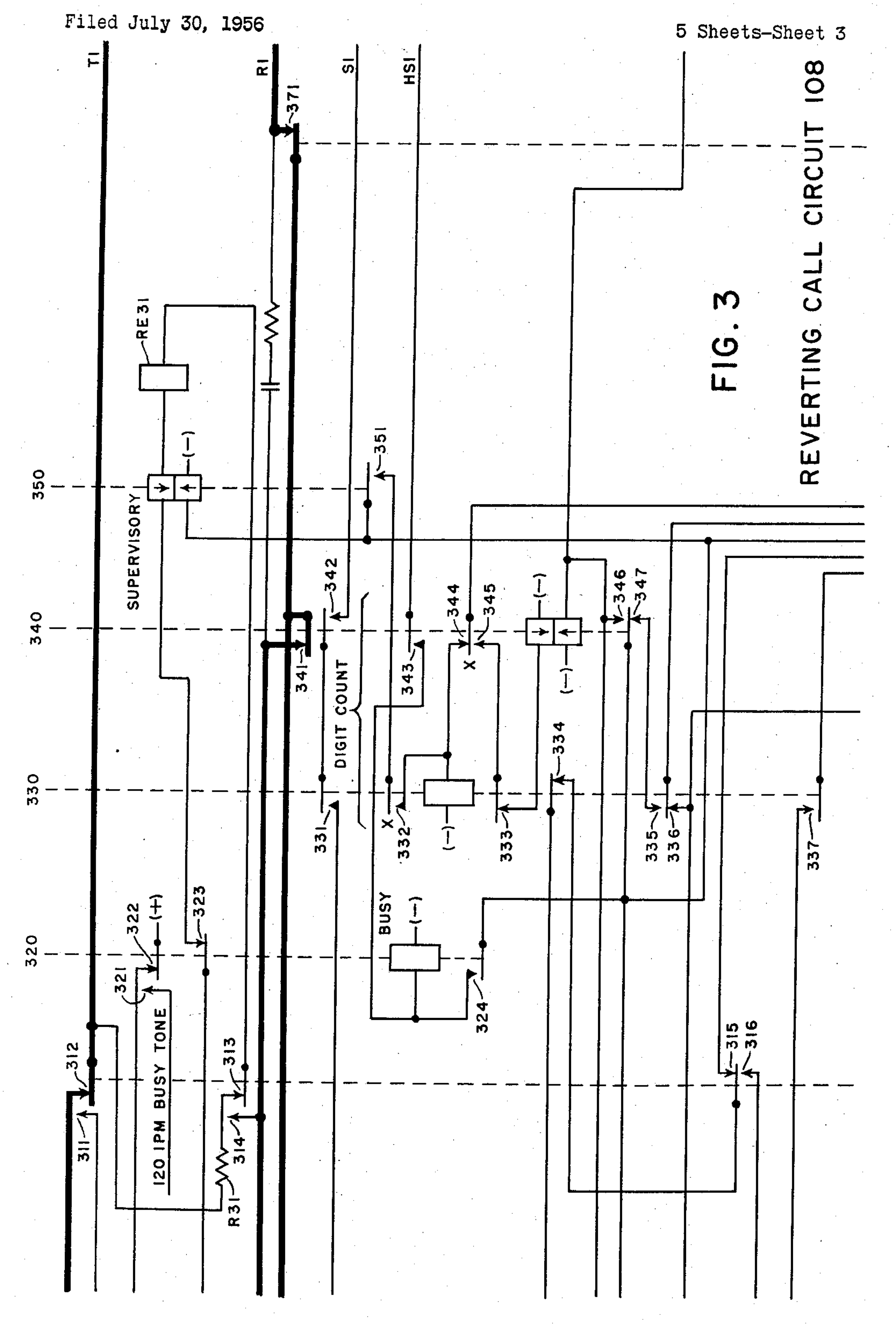
Figure 4:
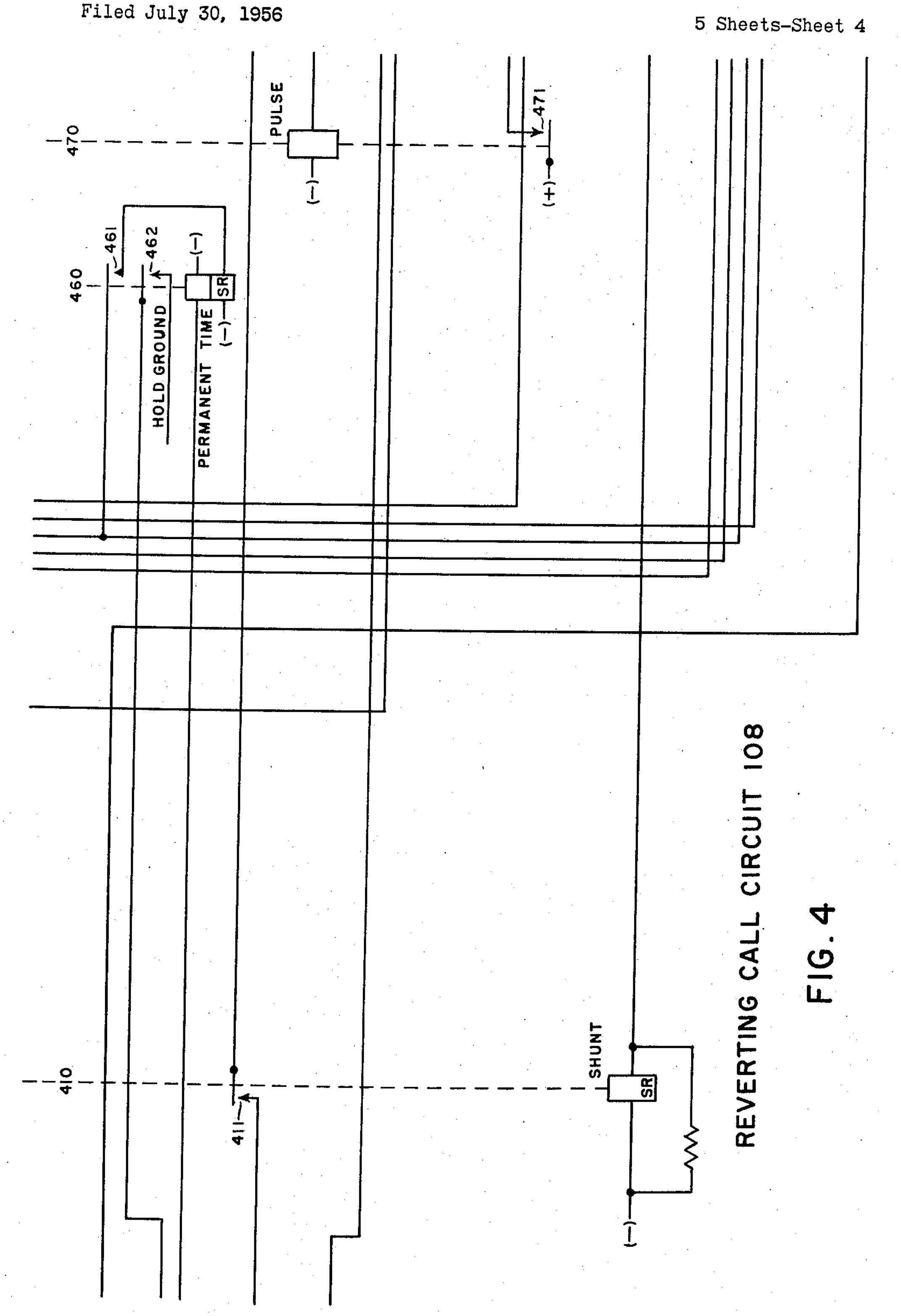
Figures 5, 6:
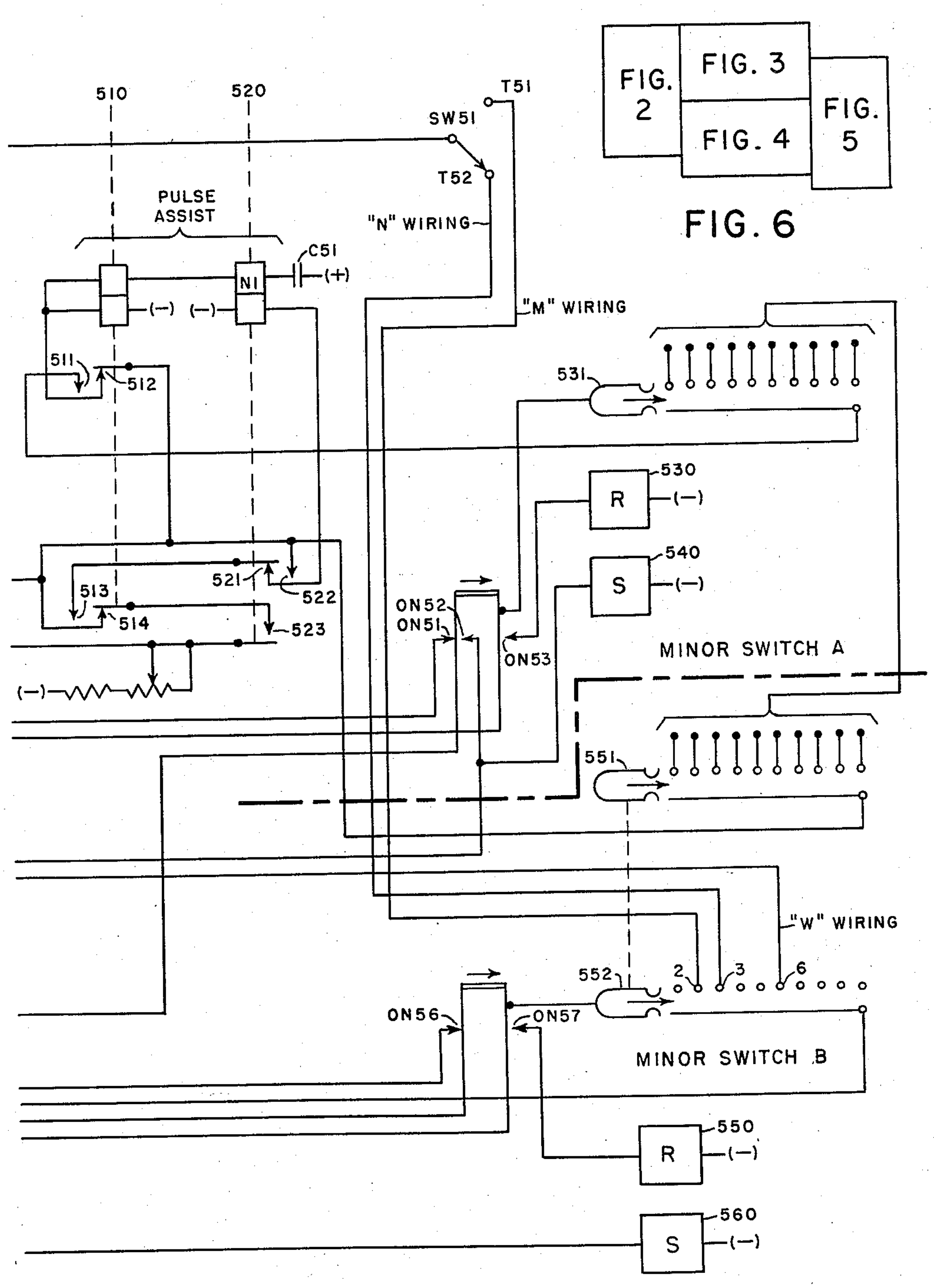

*Seizure.*—Means is provided for seizing the circuit of Figs. 2–5 when any preceding equipment, such as special selector 107 (Fig. 1), for example, seizes conductors T and R which are shown in the upper left-hand corner of Fig. 2. Responsive thereto, calling bridge relay 220 operates over a circuit which may be traced from (—) battery extended through the lower winding of calling bridge relay 220, rest contacts 212, conductor R, preceding equipment and return over conductor T, contacts 211, the upper winding of calling bridge relay 220, rest contacts 232 and 322 to ground (+). When calling bridge relay 220 operates, contacts 221 close to prepare part of the pulsing circuit. Contacts 222 close to prepare a circuit for start relay 230. Contacts 223 close thereby extending ground (+) through the winding of release delay relay 240 to (—) battery, thereby causing it to operate.

When release delay relay 240 operates, it closes its contacts 242, thereby extending a busy marking ground (+) over sleeve conductor S. Contacts 241 close thereby completing a loop for seizing the next succeeding equipment over a loop circuit that extends from the succeeding equipment over conductor T1, resistor R31, contacts 313, the winding of retard coil RE31, the upper winding of supervisory relay 350, rest contacts 323, contacts 241 on release delay relay 240, contacts 221 on calling bridge relay 220 and contacts 341 on digit count relay 340 (in parallel), contacts 371 and conductor R1 to the succeeding equipment. Also responsive to the operation of relay 240, contacts 244 open to break the circuit from the release alarm conductor, thereby forestalling any premature release. Contacts 245 close to prepare a circuit for shunt relay 410. Contacts 243 close for applying a master ground (+) potential. As the name "master ground" implies, this is the means for holding most of the relays, magnets, etc. so that removal of it releases Reverting Call Circuit 108. The application of master ground energizes the lower winding of supervisory relay 350 over the circuit extending from (—) battery through the lower winding of relay 350, and contacts 243 to ground (+). The direction of current flow over conductors T1 and R1 is such that supervisory relay 350 is differentially energized at this time.

Reverting Call Circuit 108 is now ready to receive digit pulses and nothing further happens until the calling subscriber transmits them.

*Digit absorption.*—Those skilled in the art may make fine distinctions between the manner in which various digit pulse trains may be eliminated from a directory number. For example, terms such as "digit absorption," "digit canceling," "drop-back," and the like, have been used in the past. In this specification, the term "digit absorption" is used to mean the elimination of any unwanted digits from a directory number, and is used without regard to the aforementioned fine distinctions. It should be understood, therefore, that I intend to incorporate within the scope of this term any process which may be used to eliminate, absorb, or otherwise discard from a directory number those digits which are not used.

Means (not shown) is provided for transmitting digit pulses into Reverting Call Circuit 108 in the form of the well-known "open loop" pulses. That is to say, conductors T and R extend through preceding equipment to a subscriber station where impulsing contacts in a dial are adapted to open and close a loop circuit between conductors T and R. Calling bridge relay 220 is operated and held over this loop; therefore, it responds to the start of each digit pulse by releasing and responds to the termination of each digit pulse by reoperating. When contacts 224 close during the first digit pulse, a circuit is completed for operating shunt relay 410 which may be traced from (—) battery through the winding of relay 410, resting off-normal contacts ON51, operated contacts 245 and resting contacts 224 to ground (+). Shunt relay 410 operates and closes contacts 311 thereby connecting resistor R21 across conductors T and R to provide a balancing termination which has no effect upon the direct current that is operating calling bridge relay 220 during pulsing due to the inclusion of capacitors C21 and C22. Contacts 314 close thereby connecting resistor R31 across conductors T1 and R1 in shunt with the upper winding of supervisory relay 350 and the winding of retard coil RE31. Contacts 316 complete a circuit for operating minor switch B which may be traced from (—) battery through the winding of stepping magnet 560, resting contacts 255, operated contacts 316, resting contacts 334, resting contacts 237 and operated contacts 243 to ground (+). As will be pointed out below, minor switch B takes only one step to register the occurrence of a first digit pulse train.

Returning to the operation of calling bridge relay 220 as it follows the digit pulses that are transmitted from the calling subscriber station, contacts 221 open to repeat each pulse as it is received; however, these contacts are ineffective since they are shunted at contacts 341. Contacts 222 are also ineffective since contacts 331 and 342 are now standing open. Contacts 223 and 224 break and make the circuits to release delay relay 240 and shunt relay 410; however, both of these relays are slow release so that they continue to hold throughout digit pulsing.

Hence, it is seen that at this time calling bridge relay 220 does nothing except operate minor switch B one step as an indication that a first digit pulse train has been received. At the end of that digit pulse train, calling bridge relay 220 remains in an operated condition and contacts 224 remain open for a period of time that is longer than the slow release interval of shunt relay 410 which releases.

When relay 410 releases, contacts 316 open thereby de-energizing stepping magnet 560. Wipers 551 and 552 are left standing on the first contact in their switch bank. Off-normal contacts ON56 and ON57 operate as an indication that minor switch B has moved off-normal.

Reverting Call Circuit 108 is now ready to receive the second train of digit pulses. Calling bridge relay 220 follows the pulses of the second digit impulse train by restoring at the beginning of each pulse and by reoperating at the end of each pulse. As before, shunt relay 410 operates responsive to the first digit pulse as it is repeated at contacts 224, the circuit extending from (—) battery through the winding of relay 410, contacts ON51, 245 and 224 to ground (+). Again, relays 240 and 410 are held throughout digit pulsing due to their own slow release characteristics. Contacts 316 close thereby operating stepping magnet 560 over a circuit which extends from (—) battery through the winding of stepping magnet 560, resting contacts 255, operated contacts 316, resting contacts 334, resting contacts 237, and operated contacts 243 to ground (+). Again, calling bridge relay 220 follows the digit pulses as they are received but there is no useful result except that wipers 551 and 552 of minor switch B are stepped to their second set of contacts.

At the end of the second digit pulse train, contacts 224 remain open for a period of time which is longer than the release time of shunt relay 410 so that it restores. In doing so, it closes contacts 315 thereby testing to discover whether there is a circuit which may be traced as follows: (—) battery, the lower winding of digit count relay 340, switch SW51, contact T51, wiring M, terminal 2 in minor switch B, brush 552, resting contacts 315, 334, 237, and operated contacts 243 to ground (+). If this circuit were completed at switch SW51, digit count relay 340 would operate and open its contacts 341 so that two digits are absorbed and the third is utilized to control the following equipment. However, it is assumed that switch SW51 is adjusted to connect with contacts T52; therefore, the circuit remains in the condition described with minor switch B stepped to the set of terminals marked 2 in the drawing.

The circuit is now ready to receive the next digit pulse train which is transmitted by the calling subscriber. As in the case of the two previous digits that were received by Reverting Call Circuit 108, calling bridge relay 220 restores and reoperates responsive to each digit pulse that is received. Contacts 223 open and close; however, as before, release delay relay 240 remains operated due to its own slow release characteristics. When contacts 224 close responsive to the first digit pulse, shunt relay 410 operates over the circuit extending from (—) battery through the winding of relay 410, off-normal contacts ON51, contacts 245 and 224 to ground (+). Thereafter, relay 410 holds throughout digit pulsing due to its slow release characteristics. As before, shunt relay 410 closes contacts 316 thereby causing minor switch B to take a third step whereupon brush 552 is resting on the terminal marked 3 in the drawing. At the end of the digit pulse train relay 410 releases as before. Since switch SW51 is standing on terminal T52, a circuit is completed upon release of relay 410 for operating digit count relay 340 over the circuit extending from (—) battery through the lower winding of relay 340, switch SW51, terminal T52, conductor N, terminal 3, brush 552, contacts 315, 334, 237 and 243 to ground (+).

Responsive to the operation of digit count relay 340, contacts 341 open thereby removing the shunt from around contacts 221 in preparation for the transmission of the next digit pulse train to the succeeding equipment. Contacts 342 have no function at this time. Contacts 343 close to prepare part of a busy test circuit. Contacts 345 prepare a circuit which may release relay 340 later during the call. Relay 340 locks, for the present, over a circuit that extends from (—) battery through the lower winding of relay 340, contacts 346 and 243 to ground (+).

Briefly in résumé, Reverting Call Circuit 108 was described as seized and three digit pulse trains were received. Shunt relay 410 operated responsive to the first pulse in each pulse train and released responsive to the last pulse in each pulse train; therefore, relay 410 has operated and released three times. Each time that relay 410 operated, minor switch B was driven one step so that it is left standing on its third step. Also during the receipt of the three digit pulse trains, calling bridge relay 220 released and reoperated to repeat each digit pulse as it occurred. However, the repeated pulses have no effect because pulsing contacts 221 are shunted at contacts 341. Now, after receipt of the third digit pulse train, relay 340 operates to open contacts 341, thereby rendering contacts 221 effective for repeating the digit pulses as they are received.

*Repeated digit pulses.*—Means is provided in Reverting Call Circuit 108 for receiving and repeating digit pulses. As in the case of the first three digit pulse trains, calling bridge relay 220 responds to each pulse by releasing and reoperating. When calling bridge relay 220 releases responsive to the first pulse in the pulse train, shunt relay 410 operates over the circuit which may be traced from (—) battery through the winding of relay 410, contacts ON51 on unoperated minor switch A, 245 and 224 to ground (+). Thereafter, shunt relay 410 remains operated for the duration of a pulse train due to its slow release characteristics. Each time that relay 220 releases, a digit pulse is repeated at contacts 221 to control the succeeding switch over the loop circuit which may be traced from conductor T1, through resistor R31, operated contacts 314, pulsing contacts 221, resting contacts 371 and conductor R1. Upon completion of the digit pulse train, calling bridge relay 220 remains operated and holds contacts 224 open for a period of time which is longer than the slow release time of shunt relay 410, thereby causing it to restore, all in the manner described above in connection with the first three digits. When shunt relay 410 operates, minor switch B steps on to its fourth terminals, thereby registering the fact that another digit pulse train has been transmitted to Reverting Call Circuit 108.

In a similar manner, a fifth and sixth digit pulse train may be transmitted into Reverting Call Circuit 108. Responsive to each, calling bridge relay 220 operates to repeat the digit pulses at contacts 221 to the following switch train. As in the case of preceding digits, minor switch B operates one step for each of the digit pulse trains that is received. Upon completion of the sixth digit, wiper 552 is left standing on terminal 6. When shunt relay 410 restores this time, contacts 315 close thereby connecting wiring W to ground (+) for differentially energizing digit count relay 340 over a circuit which may be traced from (—) battery through the upper winding of relay 340, contacts 333, 345, wiring W, terminal 6, brush 552, resting contacts 315, 334, 237 and 243 to ground (+). Digit count relay 340 restores when it is differentially energized and contacts 346 open the locking circuit to the lower winding of digit count relay 340. When contacts 344 close, a circuit is completed from (—) battery through the winding of digit count relay 330, resting contacts 344, wiring W, contacts 6 in minor switch B, wiper 552, contacts 315, 334, 237 and 243 to ground (+).

Digit count relay 330 operates and closes its "X" or preliminary contacts 332 thereby locking to ground (+) over the circuit which may be traced from (—) battery through the winding of relay 330, contacts 332, 351 and 243 to ground (+). Contacts 335 close, thereby completing a circuit for operating release magnet 550 which may be traced from (—) battery through the winding of magnet 550, operated off-normal contacts ON57, contacts 335, 347 and 243 to ground (+). When magnet 550 operates, minor switch B is returned to normal. Contacts 337 close to prepare a circuit for primary delay relay 250. When contacts 334 open, the ground which has been applied to the shorting bar of wiper 552 is removed. Contacts 331 close to prepare a circuit for start relay 230.

After release magnet 550 has operated and minor switch B has returned to normal, off-normal contacts ON56 and ON57 return to their normal position. Contacts ON57 open to break the circuit through the winding of release magnet 550. Contacts ON56 close thereby operating primary delay relay 250 over a circuit which may be traced from (—) battery through the upper winding of relay 250, contacts 337, resting off-normal contacts ON56, and 243 to ground (+).

When primary delay relay 250 operates, contacts 251 close thereby shunting pulsing contacts 221 which had been effective for repeating digit pulses to the next succeeding equipment during the fourth, fifty and sixth digit pulse trains. Contacts 252 open the circuit to start relay 230. Contacts 253 close for energizing the lower winding of digit count relay 340 over the circuit extending from (—) battery through the lower winding of relay 340, operated contacts 253 and 243 to ground (+). Contacts 254 and 256 close thereby completing a circuit for operating stepping magnet 560 responsive to digit pulses as they are repeated by calling bridge relay 220 at its contacts 224.

When digit count relay 340 operates, it closes contacts 342 thereby preparing a circuit for start relay 230, contacts 252 being then open. Busy relay 320 is connected to extra or helping sleeve conductor HS1 at contacts 343. Contacts 341 have no purpose at this time because the shunt to pulsing contacts 221 is maintained under the control of primary delay relay 250. Contacts 346 close thereby completing a locking circuit for digit count relay 340 which may be traced from (—) battery through the lower winding of relay 340, operated contacts 346 and 243 to ground (+).

*Registration or withholding of ringing digit.*—Means is provided for registering or withholding the digit pulse train which is used to identify the particular ringing current that is necessary to signal the called subscriber. Again, calling bridge relay 220 releases and reoperates responsive to each digit pulse that is received. The succeeding equipment is not affected by the pulsing of contacts 221 since they are shunted at contacts 251. As before, release delay relay 240 holds throughout digit pulsing due to its slow release characteristics. Responsive to the first digit pulse, shunt relay 410 operates over the circuit which may be traced from (—) battery through the winding of shunt relay 410, off-normal contacts ON51, operated contacts 245 and resting contacts 224 to ground (+). As before, shunt relay 410 holds throughout the digit pulse train due to its slow release characteristics.

Stepping magnet 560 is operated once for each digit pulse that is received because primary delay relay 250 has operated contacts 254 and 256. The stepping circuit for magnet 560 may be traced from (—) battery through the winding of magnet 560, contacts 254, 256, 245 and 224 to ground (+). On the first step, minor switch B operates its off-normal contacts ON56 and ON57. The circuit over which primary delay relay 250 originally operated is open at off-normal contacts ON56 so that it remains operated thereafter due to its own slow release characteristics and due to the periodic pulses of charging current that it receives over the circuit which may be traced from (—) battery through the lower winding of primary delay relay 250, contacts 256, 245 and 224 to ground (+). Upon completion of the last impulse in the pulse train, relay 220 remains operated, contacts 221 stay closed to recomplete the loop across conductors T and R, contacts 223 remain closed to hold release delay relay 240 in an operated condition, and contacts 224 remain open for a period of time which is long enough for shunt relay 410 and primary delay relay 250 to restore.

When relay 250 restores, the stepping circuit to minor switch B is opened at contacts 254 and 256. When contacts 252 close, start relay 230 is connected to sleeve conductor S1 over the circuit which may be traced from (—) battery through the upper winding of start relay 230, contacts 222, 252, 331 and 342 to sleeve conductor S1. Any suitable means (not shown) applies a ground (+) marking to sleeve conductor S1 for operating start relay 230.

When start relay 230 operates, it closes a holding circuit for itself which extends from (—) battery through the upper winding of relay 230, contacts 235, 252, 331 and 342 to sleeve conductor S1. Contacts 234 close thereby shunting pulsing contacts 221 so that they may not repeat digit pulses at this time. Contacts 231 close thereby extending a 60 I. P. M. (impulses per minute) busy tone through the upper winding of calling bridge relay 220 and contacts 211 to conductor T as a signal to the calling subscriber that he must hang-up his receiver or handset. Contacts 236 close thereby extending an alternate master ground for holding any equipment in Reverting Call Circuit 108 that may be operated. Contacts 238 close thereby preparing a circuit for reverting call relay 210. A circuit is completed from (—) battery through the lower winding of relay 230, contacts 239 and 462 (now open) to the conductor marked "Hold ground."

*Calling subscriber hangs up.*—Briefly, in résumé, the extension of a reverting call is being described; therefore, the calling and called lines are the same. Or, stated another way, connector 110 (Fig. 1) connects with called subscribed C's line circuit 101 at a time when calling subscriber A is extending a call through that same line circuit 101 and therefore marking it busy so that connector 110 can neither switchthrough nor extend ringing current. Furthermore, some connectors release when they encounter a busy marking. Therefore, the subject circuit has been designed to hold the last digit thereby keeping the connector from either making its busy test or releasing. Meanwhile, a busy signal is returned to the calling subscriber, thus causing him to hang-up. Responsive thereto, the subject circuit transmits the last digit pulse train to the connector which in turn tests, finds an idle line (the calling subscriber having hung-up), switches through and signals the called subscriber, all as described below.

When the calling subscriber responds by restoring his receiver or handset, the loop across conductors T and R is opened, thus releasing calling bridge relay 220. Responsive thereto, contacts 223 open; however, release delay relay 240 does not release until after the expiration of its slow release time interval. During the slow release time interval of relay 240, contacts 224 close thus completing a circuit which may be traced from ground (+) through contacts 224, 245, ON51, and the winding of shunt relay 410 to (−) battery.

When shunt relay 410 operates, contacts 411 close thereby preparing a circuit for pulse assist relay 510. Contacts 314 close to shunt the inductive effect of the upper winding of supervisory relay 350 and retard coil RE31 to complete a metallic circuit which may be pulsed at contacts 371.

*Wink-off.*—Means is provided for removing the busy marking to release the preceding switch train and then to reapply a busy marking to guard Reverting Call Circuit 108 against seizure. That is, after the expiration of its slow release time period, release delay relay 240 restores thereby removing, at contacts 242, a busy ground marking from sleeve conductor S. This, in turn, restores the switch train which extended from the calling station to Reverting Call Circuit 108. The circuit to shunt relay 410 is opened at contacts 245; however, it has slow release characteristics so that it remains operated until re-energized as described below. Reverting call relay 210 operates over the circuit from (−) battery through the winding of relay 210, contacts 238, 246 and 224 to ground (+). There is a slight time period determined by the operating characteristics of relay 210 thereby insuring the release of the preceding or calling switch train. Since connector 110 (Fig. 1) is also connected via line 111 to line circuit 101, the removal of a busy marking at contacts 242 allows connector 110 to switchthrough.

After a brief period of time marked by its delay characteristics, reverting call relay 210 operates, thereby closing contacts 213 for reapplying a busy marking ground (+) to sleeve conductor S to guard Reverting Call Circuit 108 against being seized by another call. The method of restoring a switch train that was just described, i. e., removal and reapplication of a busy marking, is called "wink-off." Contacts 211 and 212 open for breaking the incoming talking conductors T and R. Contacts 215 close thereby re-energizing shunt relay 410 (which has not yet had time to release following the opening of contacts 245) over the circuit that may be traced from (−) battery through the winding of relay 410, contacts ON51 and 215 to ground (+). Contacts 216 close to prepare a circuit for permanent time relay 460 which is provided so that ringing will be removed if the called subscriber does not answer within a certain time period. Contacts 217 close for energizing pulse assist relay 510 over the circuit which may be traced from (−) battery through the lower winding of relay 510, contacts 512, 411 and 217 to ground (+). Also, capacitor C51 is shunted over the circuit which may be traced from ground (+) through capacitor C51, the upper winding of relays 520 and 510, contacts 512, 411 and 217 to ground (+). Before this shunt was completed, capacitor C51 had charged over the circuit extending from (−) battery, through the lower and upper windings of relay 510, the upper non-inductive winding (marked "NI") of relay 520 and capacitor C51 to ground (+). Therefore, when the shunt is completed, capacitor C51 begins to discharge through the upper winding of pulse assist relay 510 thereby creating a flux which, due to the direction of current flow, is opposite to the flux that is created in the lower winding. In effect, relay 510 is differentially energized and kept from operating during a predetermined period of time. When capacitor C51 discharges sufficiently, the flux produced in the upper winding of relay 510 is reduced to a level where the flux produced in the lower winding is overpowering, thus causing relay 510 to operate.

*Pulse sending.*—When relay 510 operates, contacts 512 open to break the circuit extending through its lower winding. Capacitor C51 recharges over the circuit which may be traced from ground (+) through capacitor C51, the upper non-inductive winding of pulse assist relay 520, the upper winding of pulse assist relay 510, and the lower winding of pulse assist relay 510 to (−) battery. The current required to charge capacitor C51 is in a direction which is opposite to the discharging current so that the flux produced in the upper and lower windings are aiding and, therefore, hold pulse assist relay 510 in an operated condition for a predetermined period of time. During this period, contacts 513 are closed thereby operating pulse assist relay 520 over its lower winding, the upper winding being non-inductive so that it does not affect the operational state of relay 520.

When pulse assist relay 520 operates, it locks over a circuit which may be traced from (−) battery through the lower winding of relay 520, operated make-before-break contacts 522, contacts 411 and 217 to ground (+). Contacts 523 close thereby preparing a circuit for pulse relay 470.

After the expiration of a predetermined time period, capacitor C51 is fully charged; therefore, pulse assist relay 510 releases. Responsive thereto, contacts 514 close thus operating pulse relay 470 over a circuit which may be traced from (−) battery through the winding of pulse relay 470, operated contacts 523, 514, 411 and 217 to ground (+). Pulse relay 470 opens its contacts 371 thereby transmitting an open loop pulse over the circuit extending from conductor R1 through open contacts 371, contacts 341, 314, resistor R31, and conductor T1. Contacts 471 also close thereby operating stepping magnet 540 of minor switch A over the circuit which may be traced from (−) battery through the winding of magnet 540 and contacts 471 to ground (+). Wipers 531 advance a single step and off-normal contacts ON51 open thus breaking the circuit over which shunt relay 410 originally operated. Thereafter, relay 410 is held throughout pulsing due to its own slow release characteristics and due to the pulse-like energizing current that is extended over the circuit which may be traced from (−) battery through the winding of shunt relay 410, operated contacts ON52 and 471 to ground (+). Returning to the restoration of pulse assist relay 510, it closes its contacts 512 thereby completing a circuit which extends from (−) battery through the lower winding of pulse assist relay 510, rest contacts 512, operated contacts 411 and 217 to ground (+). This same circuit also connects the upper winding of pulse assist relay 510 to ground (+), thus shunting capacitor C51 thereby causing a discharge current through the upper winding of relay 510. The discharging current, which flows in a direction that is opposite to the charging current, creates a flux in the upper winding which opposes the flux in the lower winding thus keeping pulse assist relay 510 from reoperating at once.

After a brief period of time, capacitor C51 is discharged sufficiently and current ceases to flow through the upper winding of relay 510. Since the flux in the lower winding is no longer opposed by the flux in the upper winding, relay 510 operates thus opening its contacts 512 and closing its contacts 511. Contacts 514 open to release pulse relay 470 for terminating the digit pulse that has been transmitted at contacts 371 over conductors T1 and R1. Contacts 471 open to release stepping magnet 540. Pulse assist relay 510 opens its own circuit at contacts 512. Again, a charging current is extended over the path from (−) battery through the lower and upper windings of relay 510, the upper winding of relay 520 and capacitor C51 to ground (+) for holding relay 510 operated during the period of time that is required for capacitor C51 to recharge.

In this manner, pulse assist relay 510 generates a series of pulses which are effective for causing pulse relay 470 alternately to operate and release at a prescribed rate of pulse speed. Minor switch A is driven one step per pulse and a digit pulse is repeated over conductors T1 and R1 each time that relay 470 operates. After a number of digit pulses have been repeated at contacts 371, wiper 531 of minor switch A is driven to a terminal that is marked by wiper 551 of minor switch B. It might be recalled that minor switch B is positioned according to the numerical value of the last digit pulse train that was transmitted by the calling subscriber. Therefore, a marking circuit may now be traced from ground (+) extended through contacts 217, 411, the lower shorting bar of minor switch B, wiper 551, an associated bank terminal, a corresponding terminal in the bank of minor switch A, wiper 531, the lower shorting bar of minor switch A, operated contacts 511 and the lower winding of relay 510 to (−) battery. Relay 510 is held operated and does not restore thereafter, thus ending the transmission of digit pulses.

It might be noted that shunt relay 410 originally operated over a circuit which included off-normal contacts ON51 that are now open. Thereafter shunt relay 410 continues to be held operated due to its own slow release characteristics and due to pulsing ground that is extended through contacts 471, ON52, and the winding of relay 410 to (−) battery. When contacts 471 stop pulsing, relay 410 releases after the expiration of its slow release time period.

Briefly, in resume, a digit pulse train has been transmitted over conductors T1 and R1 to designate the ringing or other current that is necessary to signal the called subscriber. Connector 110 switched through during the "wink-off" period between the time when release delay relay 240 opened contacts 242 and reverting call relay 210 closed contacts 213. Therefore, ringing current is now extended to the called subscriber from connector 110 (Fig. 1) until he answers, or until permanent timing relay 460 operates.

*Subscriber answers.*—It is assumed that the called subscriber answers by removing his receiver or handset from a hookswitch (not shown). Responsive thereto, equipment (not shown) in connector 110 (Fig. 1) reverses the direction of current flow over the circuit that may be traced from conductor T1, through resistor R31, resting contacts 313, the winding of retard coil RE31, the upper winding of supervisory relay 350, contacts 323, 241, 341 and 371 to conductor R1. Supervisory relay 350 is differential in construction and arranged to operate responsive to this reverse battery signal. Contacts 351 open thereby releasing digit count relay 330.

When digit count relay 330 restores, contacts 331 open thereby disconnecting sleeve conductor S1 from start relay 230. Contacts 336 close, thus preparing a circuit for operating release magnet 550. Contacts 337 open, thus de-energizing the upper winding of primary delay relay 250 causing it to restore.

Start relay 230 releases when it is disconnected from sleeve conductor S1 at open contacts 331. Responsive thereto, contacts 233 open to break the circuit which formerly extended from conductor T1 through resistor R31, contacts 313, the winding of retard coil RE31, the upper winding of supervisory relay 350, rest contacts 323, 233, and contacts 371 to conductor R1 thereby releasing reverting call switch 109 (Fig. 1). Thereafter, only connector 110 is held operated during the reverting call. Contacts 236 open to break the circuit extending from master ground on contacts 236 through contacts 253 and the lower winding of digit count relay 340 to (−) battery, and also extending through the lower winding of supervisory relay 350 to (−) battery. Contacts 238 open to release reverting call relay 210.

When relay 210 releases, contacts 213 open to mark Reverting Call Circuit 108 as idle to other calls. Contacts 214 close, thus releasing the minor switches by closing a circuit which may be traced from the release alarm conductor through contacts 214, 244 and in parallel to the two release magnets. One branch of the parallel circuit may be traced from contacts 244 through operated off-normal contacts ON53 and the winding of release magnet 530 to (−) battery. The other branch of the parallel circuit may be traced from contacts 244 through contacts 336 and operated off-normal contacts ON57 to (−) battery by way of the winding of release magnet 550. Contacts 215 have no function at this time. Contacts 216 open to break a circuit that is explained below under the heading "Permanent Timing." Contacts 217 open to break a circuit which is used during pulsing operations. Nothing further happens until the next call is placed.

*All paths busy condition*

Several busy conditions may be encountered during the establishment of a call. One condition was explained above in connection with a call that is completed to a called subscriber line which is busy so that a busy tone at 60 impulses per minute is returned to the calling subscriber through contacts 231, the upper winding of calling bridge relay 220, contacts 211 and conductor T. Another type of busy condition is one wherein the called line may be idle; however, all paths which may be used to seize the called line are busy so that a busy tone of 120 impulses per minute is returned to the calling subscriber through contacts 321, 232, the upper winding of relay 220, contacts 211 and conductor T. In the following description, it is assumed that all equipment is busy and that busy tone is returned at 120 I. P. M. For example, referring to Fig. 1, if reverting call switch 109 cannot find an idle connector 110, it is necessary to return a special all paths busy tone. In this case, reverting call switch 109 (Fig. 1) is adapted to return a signal over conductor HS1.

An all paths busy condition is encountered at a time when digit count relay 340 is operated; therefore, a circuit is completed from conductor HS1, through contacts 343 and the winding of busy relay 320 to (−) battery. Since the all paths busy condition is indicated by ground (+) applied to conductor HS1, busy relay 320 operates and locks to master ground over the circuit which may be traced from (−) battery through the winding of busy relay 320, operated contacts 324 and 243 to ground (+). Contacts 322 open and 321 close thereby switching the upper winding of calling bridge relay 220 from a connection with steady ground to a connection with 120 impulses per minute busy tone which is extended through contacts 321, 232, the upper winding of calling bridge relay 220, contacts 211 and conductor T to the calling subscriber. Since the busy tone is sounding at a rate which is twice that of a normal busy tone, the calling subscriber knows that he cannot complete the call. Distinguish this from the previously described 60 I. P. M. busy signal which indicated to the calling subscriber that he should hang-up and wait for the called station to be rung. Busy relay 320 also opens its contacts 323 to break a loop extending from conductor T1 through resistor R31, contacts 313, the winding of retard coil RE31, the upper winding of supervisory relay 350, contacts 323 (now open), operated contacts 241, 221 and 371 to conductor R1, thus releasing the called switch train. Reverting Call Circuit 108 remains in the condition that it is in until the calling subscriber restores his receiver or handset.

Calling bridge relay 220 is released when the calling subscriber responds to the 120 I. P. M. busy tone by restoring his receiver or handset. Responsive thereto, contacts 223 open, thus de-energizing release delay relay 240 which has slow release characteristics. During the time while relay 240 is restoring, a circuit may be traced from ground (+) on contacts 224, through operated contacts 245, resting off-normal contacts ON51 and the winding of shunt relay 410 to (−) battery. Relay 410 operates and closes contacts 314; however, there is no loop across conductors T1 and R1 since digit add relay 340 is now holding the circuit open at its contacts 341. After release delay relay 240 restores, it removes master ground at contacts 243 thereby releasing all relays which are then operated. Also responsive to the release of relay 240, release magnet 550 is operated over the circuit which may be traced from (−) battery through the winding of magnet 550, operated off-normal contacts ON57, contacts 336, 244 and 214 to ground (+) on the conductor marked "Release Alarm." Minor switch B returns to normal. Reverting Call Circuit 108 is now in a normal condition and nothing further happens until the next call is placed.

*Permanent timing*

Another condition which could occur is illustrated by a call to a subscriber who does not answer. Having already hung-up, it is possible that the calling subscriber may not take any action to remove the ringing current. Therefore, it is necessary to provide some means in Reverting Call Circuit 108 to disconnect ringing current.

In greater detail, a circuit is prepared when reverting call relay 210 operates, as described above, to close its contacts 216 and thereby connect permanent time relay 460 to the conductor marked "Time Pulse." Common equipment, not shown, applies a ground marking to this conductor after the expiration of a predetermined period of time. Responsive thereto, a circuit is completed through contacts 216 and the upper winding of permanent time relay 460 to (−) battery. Relay 460 operates and closes its contacts 461, thus completing a circuit from (−) battery through the lower winding of relay 460, operated contacts 461 and 236 to ground (+). Also responsive to the operation of permanent time relay 460, a circuit is completed from (−) battery through the lower winding of start relay 230, operated contacts 239 and 462 to a conductor marked "Hold Ground." If the called party fails to answer within a predetermined time interval, ground potential is applied to the conductor marked "Hold Ground" by any suitable means (not shown) and current flows over a circuit which may be traced from (−) battery through the lower winding of relay 230, contacts 239 and 462 to the conductor marked "Hold Ground." Start relay 230, a differential relay, is arranged to release when current is flowing in each of its two windings. Responsive to the restoration of start relay 230, master ground (+) is removed at contacts 236 thereby restoring digit count relay 340 and permanent time relay 460. Following this, the circuit releases in the manner described above in the section entitled "Subscriber Answers."

While I have shown and described a single embodiment of my invention, other modifications will readily occur to those skilled in the art. I do not, therefore, desire that my invention be limited to the specific arrangement shown and described, and I intend in the appended claims to cover all modifications within the spirit and scope of my invention.

What I claim is:

1. In a telephone system, means for transmitting digit indications, means for establishing reverting calls responsive to a plurality of said digit indications representing directory numbers, means in said establishing means for extending said digit indications to succeeding equipment, means in said establishing means for rendering said last named means ineffective during transmission of digit indications representing first portions of said directory numbers, means responsive to digit indications representing later portions of said directory numbers for extending reverting calls from said establishing means, means in said establishing means for withholding digit indications representing final portions of said directory numbers thereby preventing busy tests, and controllable means for thereafter transmitting said withheld digit indications to determine the application of said busy tests.

2. In a telephone system, a plurality of subscriber lines including at least some party lines, switching means for interconnecting said lines, means for transmitting digit indications from calling ones of said subscriber lines, means for establishing reverting calls, means responsive to digit indications representing prefix numbers for extending reverting calls from said subscriber lines to said establishing means, means in said establishing means for absorbing digit indications that represents first portions of directory numbers, means responsive to further of said digit indications representing middle portions of said directory numbers for extending said reverting calls from said establishing means toward said party lines via said switching means, means in said establishing means for withholding digit indications representing last portions of said directory numbers thereby preventing busy tests of said party lines, and controllable means for thereafter transmitting said withheld digit indications to determine the time of application of said busy tests.

3. In a telephone system, a plurality of subscriber stations including some which are served on a party line basis, means at said subscriber stations for transmitting digit indications, switching means for interconnecting said subscriber stations, means for establishing reverting calls between subscriber stations served by party lines, means responsive to the receipt of prefix digit indications for extending calls from said subscriber stations to said establishing means, means in said establishing means responsive to the receipt of first digit indications of directory members for absorbing certain of said digit indications, means in said establishing means for repeating digit indications representing another portion of said directory numbers to extend calls from said establishing means through said switching means, means in said establishing means for withholding some digit indications representing a further portion of said directory numbers thereby preventing busy tests, and controllable means for thereafter transmitting said withheld indications to determine the time of application of said busy tests.

4. In a telephone system, a plurality of subscriber stations including some which are served on a party line basis, said stations being identified by directory numbers, means at said subscriber stations for transmitting digit indications, switching means for interconnecting said subscriber stations, said switching means including means for testing called lines to determine whether said called lines are busy or not, means for establishing reverting calls comprising reverting call circuit means, means responsive to the receipt of prefix digit indications for extending calls from said subscriber stations to said reverting call circuit means via said switching means, means in said reverting call circuit means responsive to the receipt of first digit indications of directory numbers for absorbing certain of said digit indications, means in said reverting call circuit means for repeating digit indications representing another portion of said directory numbers for extending calls from said reverting call circuit means through said switching means, means in said reverting call circuit means for withholding some digit indications thereby preventing busy tests of called party lines, and controllable means for thereafter transmitting said withheld indications to determine the time of application of said busy tests to said called party lines.

5. In a telephone system, a plurality of subscriber stations including some which are served on a party line basis, said stations being identified by directory numbers, means at said subscriber stations for transmitting digit indications, switching means for interconnecting said subscriber stations, said switching means including means for testing called lines to determine whether said called lines are busy or not, means for establishing reverting calls comprising reverting call circuit means and reverting call switch means, means responsive to digit indications representing at least one prefix number that identifies reverting calls for extending calls via first of said switching means from calling subscriber stations to said reverting call circuit means, means in said reverting call circuit means responsive to the receipt of first digit indications of directory numbers for absorbing certain of said digit indications, means in said reverting call circuit means for repeating digit indications representing another portion of said directory numbers for extending calls from said reverting call circuit means to said reverting call switch means and via other of said switching means to said party lines, means in said reverting call circuit means for withholding some digit indications thereby preventing busy tests of called party lines, and controllable means for thereafter transmitting said withheld indications to determine the time of application of said busy test to said called party line.

6. In a telephone system, a plurality of subscriber stations including some which are served on a party line basis, means at said subscriber stations for transmitting digit indications, switching means for interconnecting said subscriber stations responsive to said digit indications, means for establishing reverting calls comprising reverting call circuit means and reverting call switch means, said reverting call circuit including stepping means, means responsive to digit indications representing at least one prefix number that identifies reverting calls for extending calls via first of said switching means from said subscriber stations to said reverting call circuit means, means in said reverting call circuit means for repeating said digit indications, means in said reverting call circuit means for operating said stepping means at the rate of one step per digit indication, means in said reverting call circuit means for blocking said repeating means thereby absorbing certain of said digit indications, means responsive to a predetermined number of steps by said stepping means for unblocking said repeating means whereby said digit indications may be utilized to extend calls through other of said switching means, means responsive to additional steps by said stepping means for reblocking said repeating means, means for registering additional digit indications in said stepping means while said repeating means is blocked, thereby withholding digit indications to prevent busy tests of called party lines, and means for thereafter sending said registered indications thereby determining the time of application of said busy tests.

References Cited in the file of this patent

UNITED STATES PATENTS

| | | |
|---|---|---|
| 2,335,473 | Bakker | Nov. 30, 1943 |
| 2,659,769 | Elliott | Nov. 17, 1953 |